July 16, 1935.   J. B. PICARD   2,008,646
BELT TIGHTENER
Filed Oct. 30, 1933    2 Sheets-Sheet 1
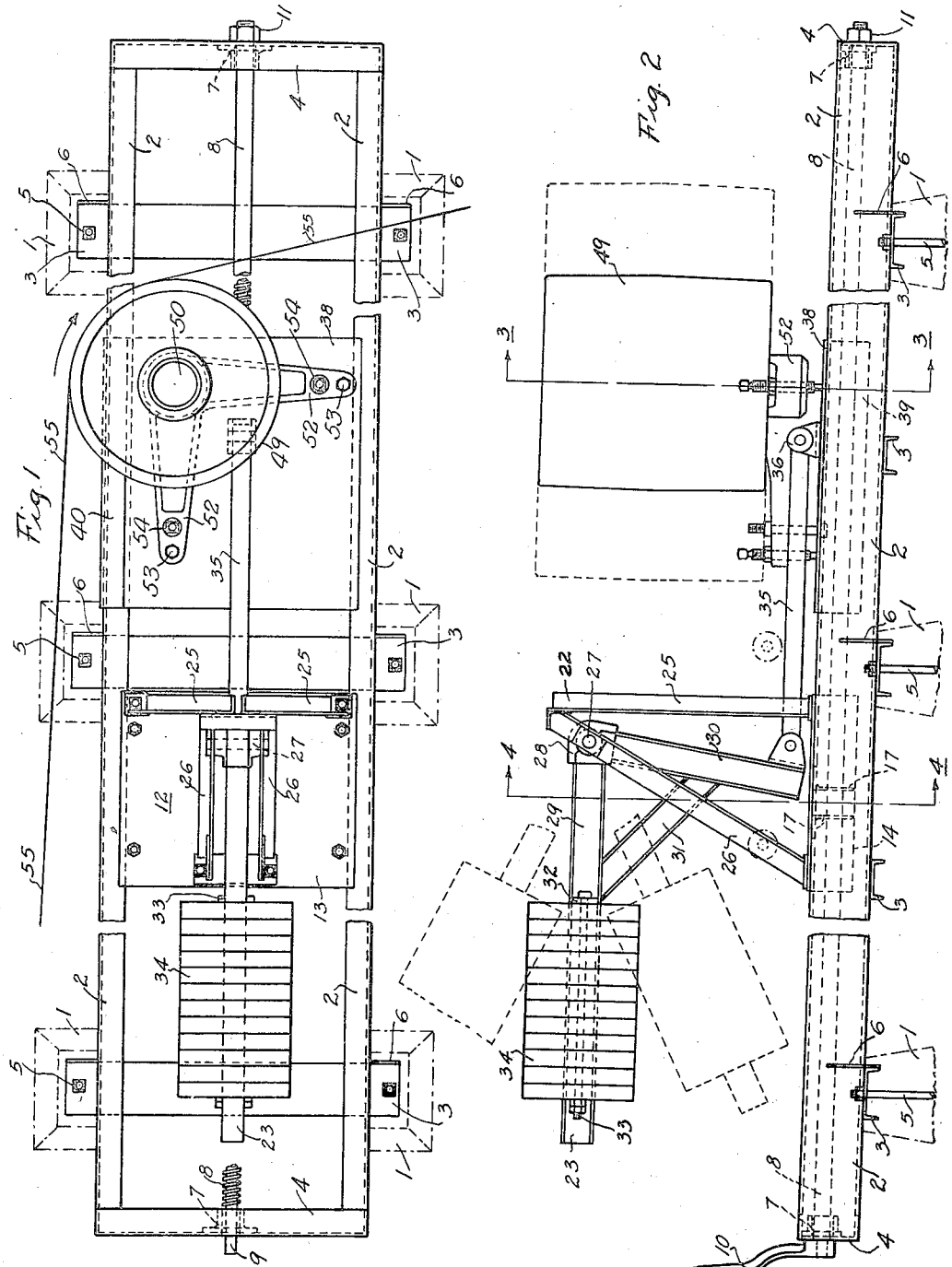
INVENTOR
John B. Picard.

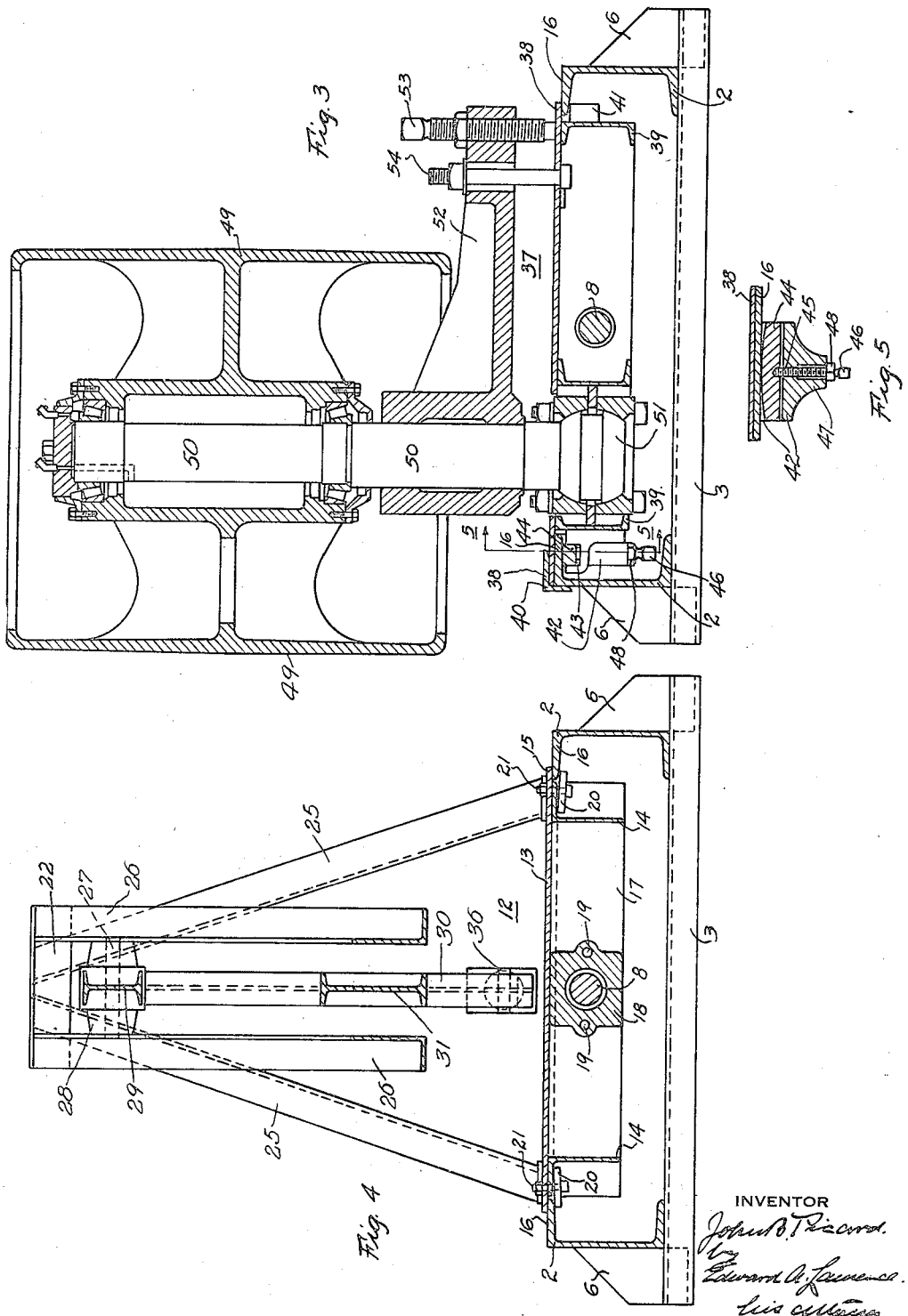

Patented July 16, 1935

2,008,646

UNITED STATES PATENT OFFICE 2,008,646

BELT TIGHTENER

John B. Picard, Toledo, Ohio, assignor to The National-Superior Company, Toledo, Ohio, a corporation of Delaware Application October 30, 1933, Serial No. 695,874

13 Claims. (Cl. 74—242.11)

My invention relates to automatic belt tighteners designed particularly for taking up the slack to maintain correct tension upon endless belts.

The principal object of this invention is to provide a belt tightener with an automatic adjusting mechanism for forcing the idler pulley of the mechanism into the run of an endless belt to hold the belt under proper tension.

Another object of my invention resides in the design of a carriage arranged to support a belt tightener pulley which carriage is permitted to oscillate within a prescribed distance determined by the load transmitted by the endless belt to which the mechanism is applied.

A further object lies in structural support of the carriage of my belt tightener and the manner in which it is frictionally attached thereto.

Another object resides in the design and application of the counterweight mechanism of my belt tightener.

Other objects appear hereinafter.

In the accompanying drawings, wherein I have illustrated a practical embodiment of the principles of my invention, Fig. 1 is a plan view showing in assembly the parts making up my belt tightener including its foundation.

Fig. 2 is a side elevation of Fig. 1.

Fig. 3 is a sectional view of the belt tightener support and the pulley carriage taken on the line 3—3 of Fig. 2.

Fig. 4 is a sectional view of the counterweight carriage taken along the line 4—4 of Fig. 2.

Fig. 5 is a fragmentary sectional view showing the shoe construction of my invention and taken on the line 5—5 of Fig. 3.

Referring to the drawings and more particularly to Figs. 1 and 2, 1 designates individual concrete or other suitable foundations arranged to support the rails or guide members 2, which are held in rigid relation by the cross ties 3 and the end sills or cross members 4 welded thereto. The ties 3 are secured to the foundations 1 by means of the upwardly projecting stud-bolts 5 which are anchored in the concrete foundations 1.

As shown in Fig. 2, preferably the rails 2 are not horizontal but are inclined downwardly from left to right.

The rails 2 are of channel shape and are laterally braced by means of the plates 6 which are welded to the side of the cross ties 3 and to the face of the rails 2.

The end cross members 4 have secured thereto the bearings 7 in which are journaled the opposite ends of the screw shaft 8. One end of the screw shaft 8 is provided with a squared portion 9 adapted to receive a crank handle 10 for rotating the shaft.

The other end of the shaft is supplied with the nut 11 to hold the shaft from longitudinal movement.

12 designates the counterweight mechanism comprising a base plate 13 having the angle beams 14 welded to the under side of said plate and forming a rigid carriage. The base plate 13 extends laterally beyond the angle structure of the carriage as shown at 15 and is arranged to ride upon the upper faces of the top flanges 16 of the rails 2. Clearance is provided between the edges of the beams 14 and the edges of the flanges 16 so that the carriage may be slid along the rails 2.

17 represents a pair of oppositely disposed angle brackets welded to the under side of the base plate 13 and supporting between them the nut 18 through which the bar 8 is screwed.

The nut 18 is secured to the brackets 17 by the bolts 19, as shown in Fig. 4. The brackets 17 are provided with clearance holes through which the screw bar or shaft 8 extends. By turning the crank 10 the screw shaft may be rotated, thus causing the carriage 12 to be moved along the rails 2 to any desired position wherein it may be clamped by means of the four clamping plates 20 which engage the under face of the flanges 16 when the bolts 21 which extend through said plates and through the plate 13 are tightened.

22 represents a pair of triangular frames mounted on the carriage 12 and arranged to support a counterweight beam 23. The triangular frames 22 comprise the lateral side braces 25 and the lateral rear braces 26. The rear braces 26 are provided with alined holes arranged to support the pin 27 upon which the bearings 28 of the beam 23 are permitted to oscillate.

The beam 23 comprises a horizontal I-beam member 29, a pendant member 30 and a diagonal brace member 31. The beam member 29 is provided with the lugs 32 disposed on opposite sides thereof and arranged to receive the bolts 33 which hold the weights 34 on the mechanism. The weights 34 contain holes of the contour of the I-beam 29 to snugly fit the same. When they are slid onto the beam they need only be held from sliding off.

The lower end of the pendant member 30 has pinned thereto one end of the connecting rod or link 35. The other end of the rod is pinned to the bracket 36 of the pulley carriage 37.

38 represents the base plate of the carriage 37 and its lateral edges overlap or extend over the top flanges 16 of the rails 2 so that the pulley carriage is slidably mounted on said rails. The plate 38 is supported by an underframe formed of channel irons 39. The side of the base plate 38 adjacent to the endless belt has welded thereto an angle iron 40 which is arranged to extend down over the outer face of the rail 2 to transmit the side thrust caused by the tension of the belt as it rotates against the pulley, to the track and foundation of the mechanism.

The frame structure of the pulley carriage 37 has welded thereto the lug 41 as shown in the left in Fig. 3, which lug extends under the top flange of the adjacent rail 2 with sufficient clearance to permit the pulley carriage to slide on the rails. At its opposite side the frame of the pulley carriage is provided with a bracket 42 slotted on its upper face at 43 to receive a shoe 44 which frictionally engages the top flange of the adjacent rail from below. The under side of the shoe 44 is provided with a hole 45 to receive a bolt 46 which passes through a threaded sleeve 47 integral with the bracket 42. The bolt 46 is provided with the lock nut 48 for holding the shoe against the flange at the desired pressure.

49 represents the belt pulley which is rotatably mounted on a spindle 50 which is supported by the frame of the carriage 37 by the ball and socket arrangement shown at 51. The quadrant arms 52 extend laterally from the spindle 50 and are arranged to tilt the pulley to the desired angle to properly engage the belt. The position of the pulley is adjusted in the usual manner by means of the bolts 53 and 54. 55 represents the belt which travels around the pulley as indicated by the arrow in Fig. 1.

I claim:—

1. In a belt-tightener, the combination of a support, a counterweight device movably mounted on said support, a carriage slidably mounted on said support, a pulley rotatably mounted on the carriage, operative connection between the counterweight device and the carriage whereby the pulley is urged against the run of a belt by said counterweight, and means for adjusting the counterweight device toward and away from the pulley while maintaining uninterrupted the normal operation of the pulley.

2. In a belt-tightener, the combination of a support, a counterweight device movably mounted on said support to swing on a horizontal axis, a lever in angular relation to the counterweight and swinging therewith, a carriage slidably mounted on the support, a pulley rotatably mounted on the carriage, a link connecting the lever and the carriage whereby the pulley is urged against the run of a belt by said counterweight, and means for adjusting the counterweight device toward and away from the pulley while maintaining uninterrupted the normal operation of the pulley.

3. In a belt-tightener, the combination of a base, a support arranged to be adjustably positioned along the base, a counterweight device mounted on said support, a carriage mounted on the base and arranged for movement toward and away from the support, a pulley rotatably mounted on the carriage, operative connection between the counterweight device and the carriage whereby the pulley is urged against the run of a belt by the counterweight device, and means for adjusting the counterweight device toward and away from the pulley while maintaining uninterrupted the normal operation of the pulley.

4. In a belt-tightener, the combination of a base, a support arranged to be adjustably positioned along the base, a counterweight device movably mounted on said support, a carriage mounted on the base and arranged for movement toward and away from the support, a pulley rotatably mounted on the carriage, an operative connection between the counterweight device and the carriage whereby the pulley is urged against the run of a belt by the counterweight device, means for varying the effective pressure of the pulley against the belt, and means for adjusting the counterweight device toward and away from the pulley while maintaining uninterrupted the normal operation of the pulley.

5. In a belt-tightener, the combination of a base, a support movably mounted on said base and arranged to be fixed relative thereto, a counterweight device mounted on the support, a carriage slidably mounted on the base for movement toward and away from the support, a pulley rotatably mounted on the carriage, operative connection between the counterweight and the carriage whereby the pulley is urged against the run of a belt by the counterweight, means for varying the frictional engagement between the carriage and the base, and means for adjusting the counterweight device toward and away from the pulley while maintaining uninterrupted the normal operation of the pulley.

6. In a belt-tightener, the combination of a base, a support, a counterweight device movably mounted on the support, a carriage slidably mounted on the base for movement toward and away from the support, a pulley rotatably mounted on the carriage, operative connection between the counterweight device and the carriage whereby the pulley is urged against the run of a belt by the counterweight device, means for varying the frictional engagement between the carriage and the base, and means for adjusting the counterweight device toward and away from the pulley while maintaining uninterrupted the normal operation of the pulley.

7. In a belt-tightener, the combination of a base, a support, a counterweight device movably mounted on the support, a carriage slidably mounted on the base for movement toward and away from the support, a pulley rotatably mounted on the carriage, operative connection between the counterweight device and the carriage whereby the pulley is urged against the run of a belt by the counterweight device, means for varying the frictional engagement between the carriage and the base, means for varying the effective pressure of the pulley as it is urged against the belt and means for adjusting the counterweight device along the support while maintaining uninterrupted the normal operation of the pulley.

8. In a belt tightener, the combination with a base, a carriage movable along the base and a pulley rotatably mounted on the carriage and arranged to engage the belt, of a counterweight device independently mounted on the base and arranged to be moved along the same, operative connection between the counterweight device and the carriage, and means for adjusting said counterweight device along the base while the pulley continues to perform its normal function.

9. In a belt tightener, the combination with a base, a carriage movable along the base and a pulley rotatably mounted on the carriage and arranged to engage the belt, of a counterweight device independently mounted on the base and arranged to be moved along the same, a link connecting said counterweight device with said pulley carriage, and means for adjusting said counterweight device along the base while the pulley continues to perform its normal function.

10. In a belt tightener, the combination of a track including two members, a carriage movable along the track, a pulley rotatably mounted on the carriage in a substantially vertical plane and arranged to engage a belt, means on the carriage arranged to engage the outer face of one of the track members to hold the carriage against side thrust of the belt, and counterweight means to urge the pulley into the belt.

11. In a belt tightener, the combination of a track including two members, a carriage movable along the track, a pulley rotatably mounted on the carriage in a substantially vertical plane and arranged to engage a belt, means on the carriage arranged to engage the outer face of one of the track members to hold the carriage against side thrust of the belt, a second means on the carriage arranged to engage said track member to prevent upward movement of said carriage, and counterweight means to urge the pulley into the belt.

12. In a belt-tightener of the character described, the combination of an elongated base, a counterweight device and a carriage mounted in tandem on said base, the counterweight device being movable and the carriage being slidable on the base, a pulley mounted on the carriage and arranged to engage the belt, a link operatively connecting the counterweight device and the carriage, and means operative while the belt-tightener is in normal operation for moving the counterweight device along the base whereby to take up the slack of the belt without interrupting the operation of the belt-tightener.

13. In a belt-tightener of the character described, the combination of an elongated base, a counterweight device and a carriage mounted in tandem on said base, the counterweight device being movable and the carriage being slidable on the base, a pulley mounted on the carriage and arranged to engage the belt, a link operatively connecting the counterweight device and the carriage, a rotary screw shaft rotatably mounted on the base and held against longitudinal movement, and a nut mounted on the counterweight device and engaged by said screw shaft whereby to move the counterweight device along the base and thus take up slack in the belt without interrupting the normal operation of the belt-tightener.

JOHN B. PICARD.